United States Patent
Lee et al.

(10) Patent No.: US 9,594,502 B2
(45) Date of Patent: Mar. 14, 2017

(54) METHOD AND SYSTEM FOR REMOTE CONTROL, AND REMOTE-CONTROLLED USER INTERFACE

(75) Inventors: Young Hoon Lee, Daejeon (KR); Chan Hui Kang, Yongin-si (KR); Jong Cheol Kim, Seoul (KR); Hyun Ho Kim, Seoul (KR)

(73) Assignee: KT CORPORATION, Seongnam-si (KR)

( * ) Notice: Subject to any disclaimer, the term of this patent is extended or adjusted under 35 U.S.C. 154(b) by 0 days.

(21) Appl. No.: 14/368,139

(22) PCT Filed: Feb. 29, 2012

(86) PCT No.: PCT/KR2012/001538
§ 371 (c)(1),
(2), (4) Date: Jun. 23, 2014

(87) PCT Pub. No.: WO2013/094821
PCT Pub. Date: Jun. 27, 2013

(65) Prior Publication Data
US 2014/0371954 A1 Dec. 18, 2014

(30) Foreign Application Priority Data
Dec. 21, 2011 (KR) .................. 10-2011-0139632

(51) Int. Cl.
*G06F 3/0488* (2013.01)
*G08C 17/02* (2006.01)
(Continued)

(52) U.S. Cl.
CPC ......... *G06F 3/0488* (2013.01); *G05D 1/0022* (2013.01); *G06F 3/0346* (2013.01);
(Continued)

(58) Field of Classification Search
CPC ...... G05D 1/00; G05D 1/0011; G05D 1/0022; G06F 3/0346; G06F 3/048; G06F 3/0481;
(Continued)

(56) References Cited

U.S. PATENT DOCUMENTS 7,877,798 B2* 1/2011 Saunders et al. ............... 726/20
2008/0027591 A1* 1/2008 Lenser et al. .................. 701/2
(Continued)

FOREIGN PATENT DOCUMENTS

JP 9-322262 A 12/1997
KR 10-1033726 B1 5/2011
(Continued)

OTHER PUBLICATIONS

International Search Report of PCT/KR2012/001538, dated Nov. 29, 2012.

*Primary Examiner* — Jerrah Edwards
*Assistant Examiner* — Tamara Weber
(74) *Attorney, Agent, or Firm* — Sughrue Mion, PLLC

(57) ABSTRACT

A method and system for remote control and remote-controlled user interface. A remote control method of target terminal by a mobile communication terminal comprises: displaying a plurality of control methods for remote control of the target terminal; when one of the plurality of control methods is selected, displaying a control screen corresponding to the selected control method; and when a control attribute value displayed in the control screen is set, transmitting a control message comprising the set control attribute value to the target terminal, wherein the control methods include at least one of a directional touch, a tilt and a pattern input by continuous touch.

39 Claims, 15 Drawing Sheets

(51) Int. Cl.
*H04M 1/725* (2006.01)
*G06F 3/0346* (2013.01)
*G05D 1/00* (2006.01)

(52) U.S. Cl.
CPC ........ *G08C 17/02* (2013.01); *H04M 1/72533* (2013.01); *G08C 2201/70* (2013.01); *G08C 2201/93* (2013.01); *H04M 2250/02* (2013.01); *H04M 2250/06* (2013.01)

(58) Field of Classification Search
CPC .. G06F 3/04817; G06F 3/0482; G06F 3/0487; G06F 3/0488; G08C 17/02; G08C 2201/70; G08C 2201/93; H04M 1/72533; H04M 2250/02; H04M 2250/06
See application file for complete search history.

(56) References Cited

U.S. PATENT DOCUMENTS

| | | | |
|---|---|---|---|
| 2009/0157221 A1 | 6/2009 | Sip | |
| 2009/0278812 A1* | 11/2009 | Yasutake | 345/173 |
| 2010/0045490 A1* | 2/2010 | Odell | H03M 11/14 341/22 |
| 2010/0214214 A1* | 8/2010 | Corson et al. | 345/158 |
| 2010/0257450 A1* | 10/2010 | Go et al. | 715/733 |
| 2010/0304640 A1* | 12/2010 | Sofman et al. | 446/456 |
| 2011/0074768 A1* | 3/2011 | Takayama | 345/419 |
| 2011/0191516 A1 | 8/2011 | Xiong et al. | |
| 2011/0238211 A1* | 9/2011 | Shirado et al. | 700/246 |

FOREIGN PATENT DOCUMENTS

| | | |
|---|---|---|
| KR | 10-2011-0071220 A | 6/2011 |
| KR | 10-2011-0088136 A | 8/2011 |

\* cited by examiner

FIG. 3
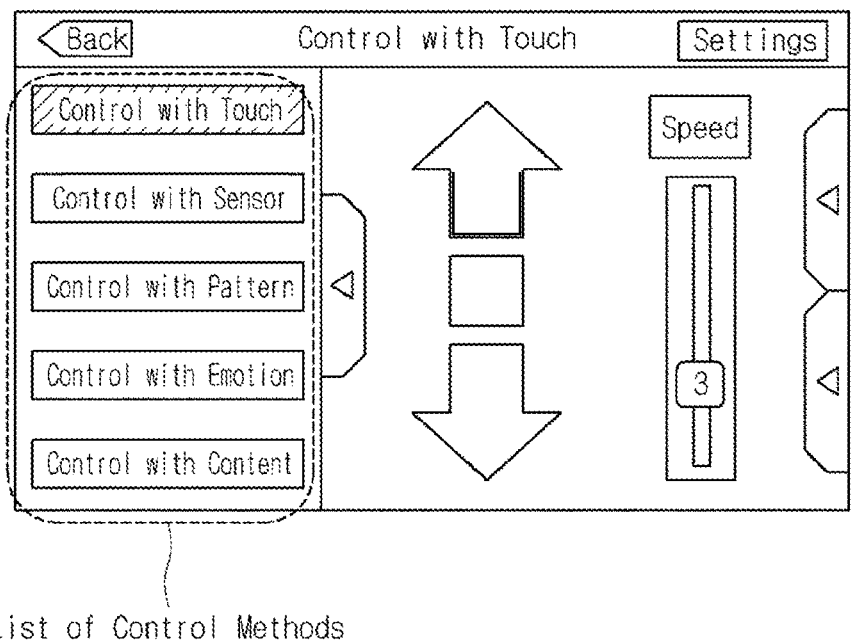
List of Control Methods
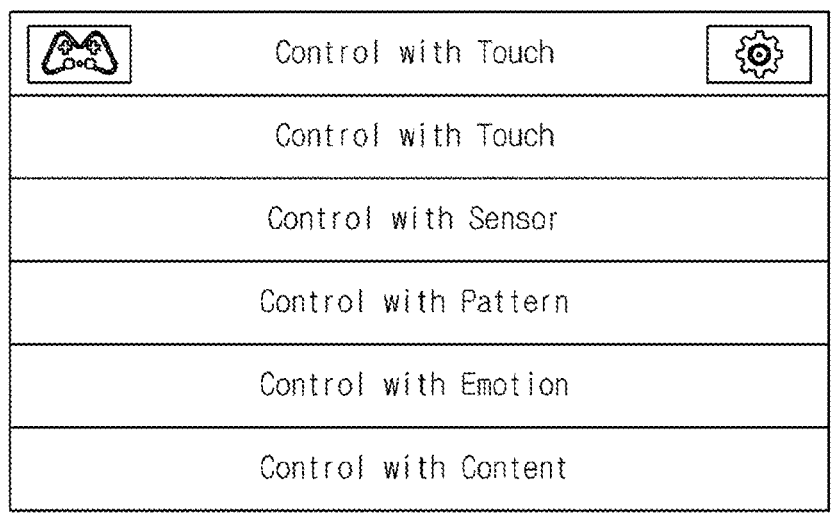
Another List of Control Methods List of Control Methods FIG. 9
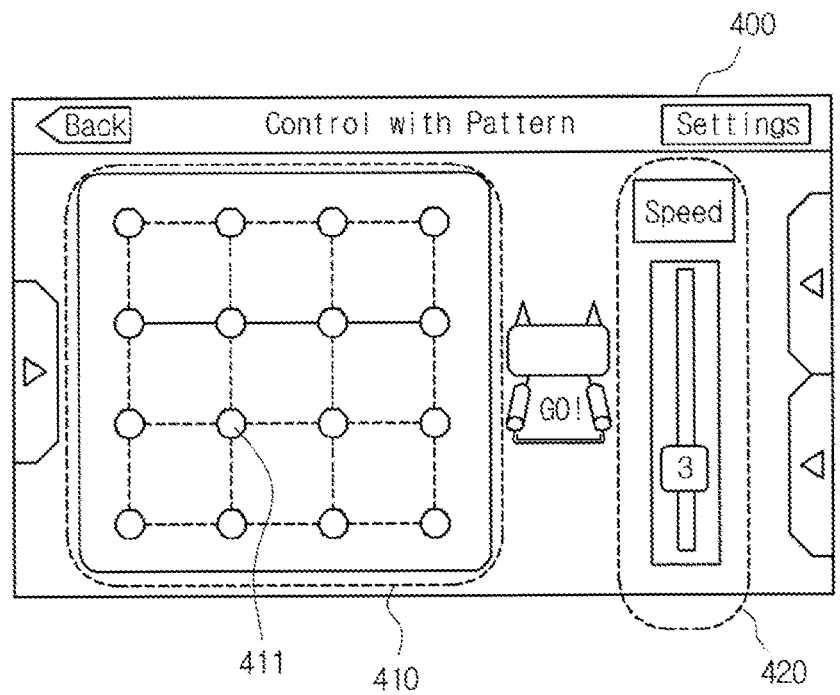
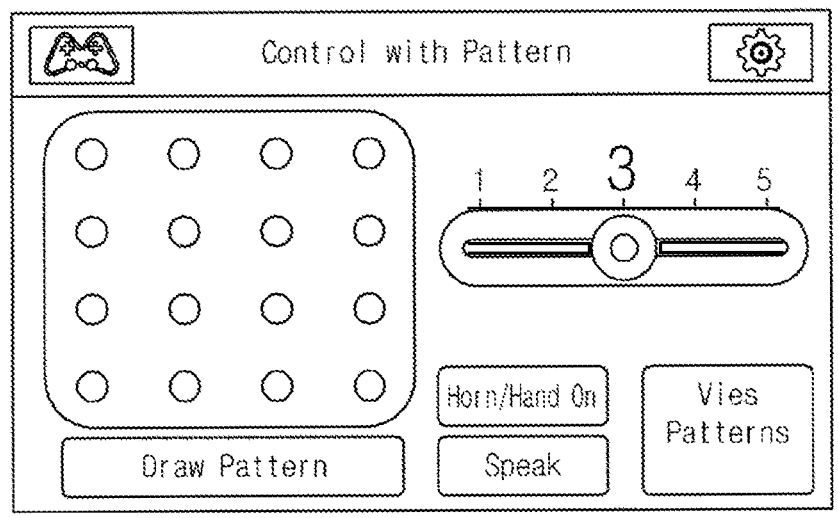
Another Control Screen FIG. 10
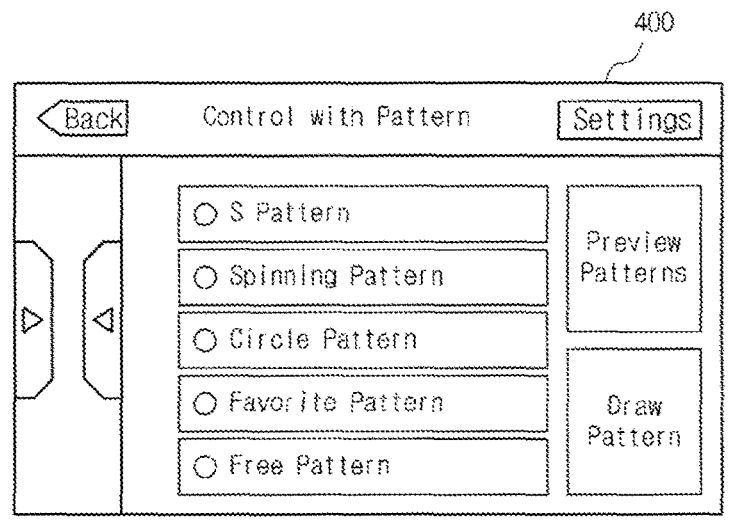
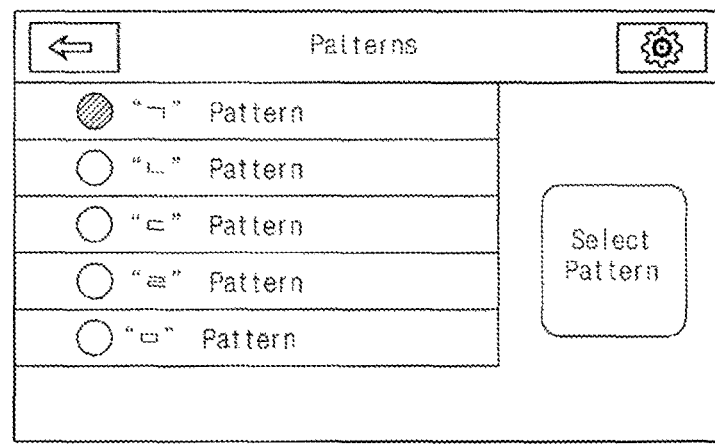
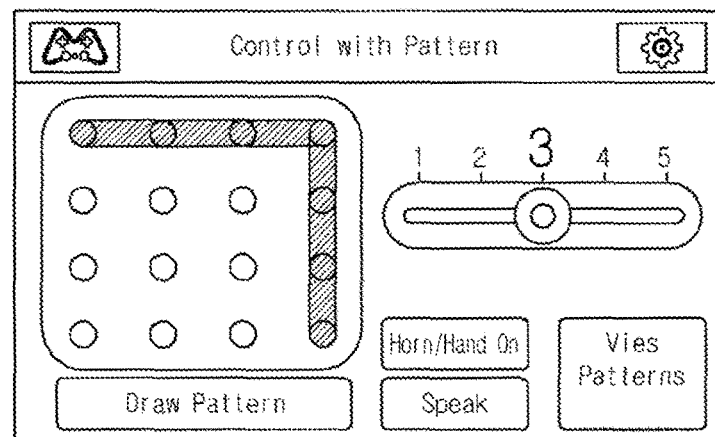
Another Control Screen List of Control Methods FIG. 13
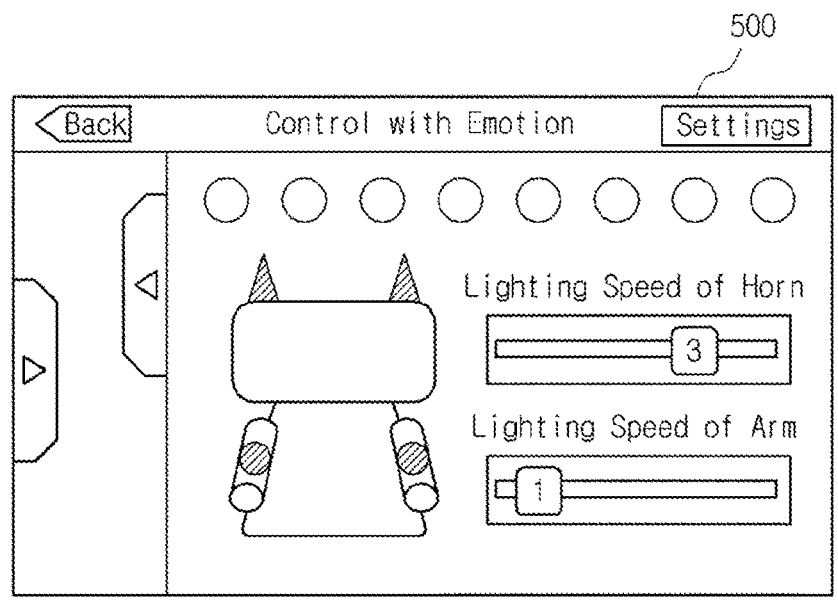
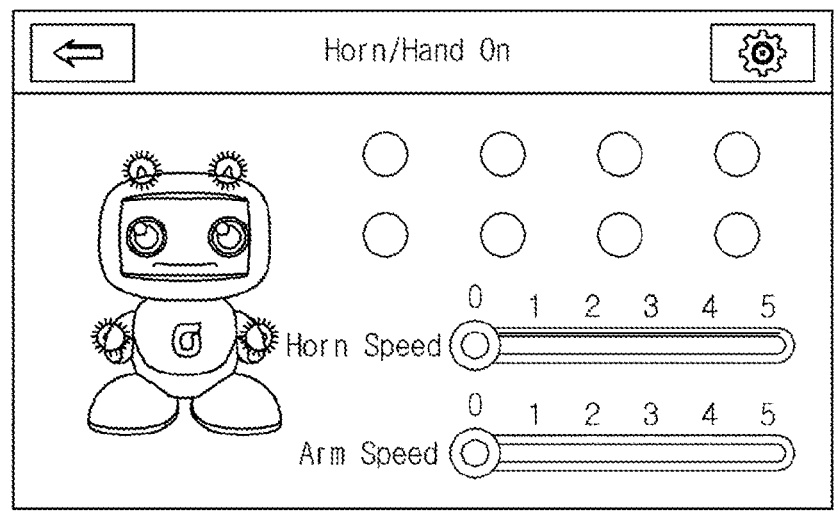
Another Control Screen FIG. 16
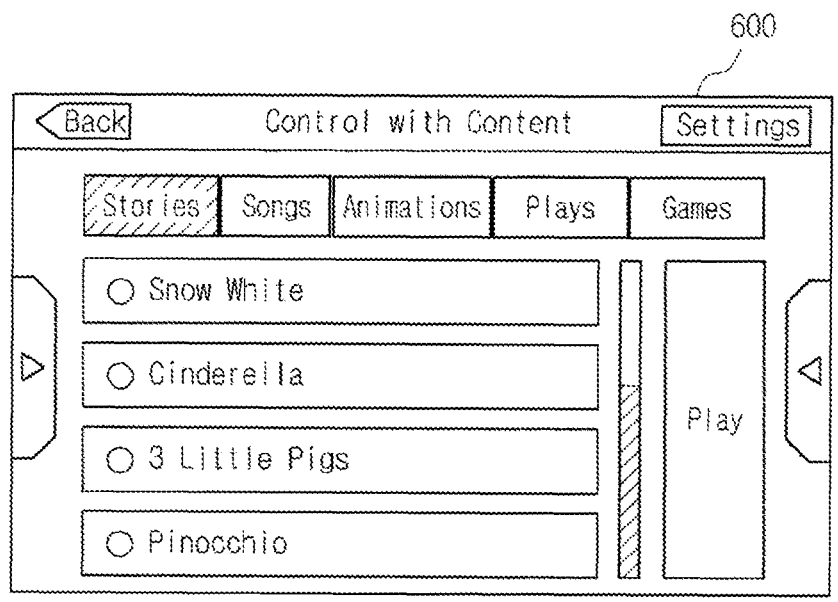
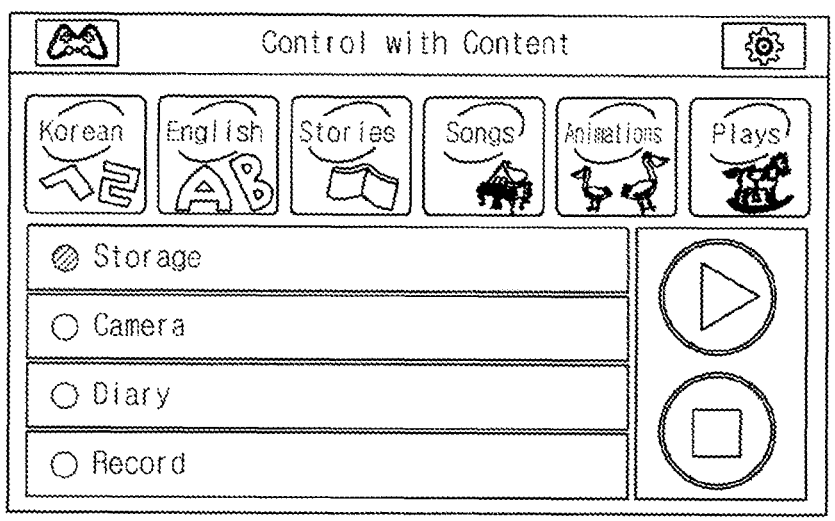
Another Control Screen

METHOD AND SYSTEM FOR REMOTE CONTROL, AND REMOTE-CONTROLLED USER INTERFACE

CROSS REFERENCE TO RELATED APPLICATION

This application is a national stage entry of PCT International Application No. PCT/KR2012/001538, filed on Feb. 29, 2012 which claims the benefit of priority from Korean Patent 2011-0139632, filed on Dec. 21, 2011, entitled "Method and system for remote control and remote-controlled user interface", the disclosures of which are hereby incorporated by reference in their entireties into this application.

BACKGROUND

1. Field

Exemplary embodiments broadly relate to a method, system and user interface for a remote control.

2. Description of the Related Art

An autonomous toy robot system operated by a user or surrounding environment has recently been developed.

However, operations and controls of existing robot systems are simple and even such operations are performed according to pre-arranged methods. Thus, not only users (particularly, children) are easily bored but also operations are only controlled by a remote control and the like.

KR Utility Model No. 20-423032 (Educational Humanoid Robot Platform Based on PC) describes an educational humanoid robot platform based on PC, modularized to assemble and disassemble components to perform basic motions of a robot in various ways.

In the point of view of an object robot, since each component configuring the robot is modularized, the robot is able to move conveniently and flexibly and is not inconvenienced by space limitations due to its small size. However, from a user's perspective, who is the one that controls the robot, the user has to control the robot through a PC which is big and heavy. Due to the use of the PC, space restrictions and movement limitations for the user exist.

Accordingly, there is a demand for research on control methods of robots through various interfaces which allow convenient remote controls using a mobile communication terminal and direct controls of motions of a robot (moving direction, distance and speed, etc.) by a user as well as controls by predetermined methods provided by a robot provider.

SUMMARY

Exemplary embodiments are developed to resolve the disadvantages associated with the related-art technologies. Exemplary embodiments provide a method, system and user interface for a remote control, which can easily control a target terminal through various interfaces provided from a mobile communication terminal.

Illustrative, non-limiting embodiments may overcome the above disadvantages and other disadvantages not described above. The present invention is not necessarily required to overcome any of the disadvantages described above, and the illustrative, non-limiting embodiments may not overcome any of the problems described above. The appended claims should be consulted to ascertain the true scope of the invention.

According to an aspect of exemplary embodiments, there is provided a method for remotely controlling a target terminal by a mobile communication terminal, comprising: displaying a plurality of control methods for a remote control of the target terminal; displaying a control screen corresponding to a control method selected from the displayed plurality of control methods; and transmitting to the target terminal a control message comprising a set control attribute value based on a setting of the control attribute value displayed in the control screen, wherein the control method includes at least one of: a directional touch, a tilt and a pattern input by continuous touch.

According to an exemplary embodiment, when a control method with the directional touch is selected from the plurality of control methods, displaying the control screen having at least one of: a moving direction setting region to set at least one of a moving direction and a moving distance of the target terminal and a moving speed setting region to set a moving speed of the target terminal using the directional touch.

According to an exemplary embodiment, when a control method with the directional touch is selected from the plurality of control methods, displaying the control screen having an action setting region to set a moving direction and a moving speed of the target terminal using the directional touch.

According to an exemplary embodiment, the method further includes calculating a direction and a length of the touch inputted into the control screen as a control attribute value for at least one of the moving direction, the moving distance, and the moving speed.

According to an exemplary embodiment, when a control method with the tilt is selected from the plurality of control methods, displaying the control screen having at least one of a moving direction setting region to set at least one of a moving direction and a moving distance of the target terminal and a moving speed setting region to set a moving speed of the target terminal using the tilt.

According to an exemplary embodiment, the moving direction setting region includes an avatar relating to the target terminal in which the avatar moves within the moving direction setting region according to a tilt angle and duration of the tilt of the mobile communication terminal.

According to an exemplary embodiment, the method further includes calculating a tilt angle and duration of the tilt of the mobile communication terminal as a control attribute value for the moving direction and moving distance, and calculating a setting value corresponding to the touch input into the moving speed setting region as a control attribute value for the moving speed.

According to an exemplary embodiment, when a control method with the tilt is selected from the plurality of control methods, displaying the control screen to set a moving direction and a moving speed of the target terminal by using motion including the tilt of the mobile communication terminal, wherein the control screen includes a fingerprint region which is contacted by a user's fingerprint, and wherein, when a motion including the tilt is performed while the user's fingerprint is in contact with the fingerprint region, setting the moving direction and the moving speed of the target terminal.

According to an exemplary embodiment, the method further includes calculating a motion including the tilt of the mobile communication terminal as a control attribute value for the moving direction and moving speed in which the motion including the tilt directs the screen of the mobile communication terminal to an up, down, left or right direction.

According to an exemplary embodiment, when a control method with the pattern input by a continuous touch is selected from the plurality of control methods, displaying the control screen having at least one of a moving path setting region to set a moving path of the target terminal and a moving speed setting region to set moving speed of the target terminal according to the pattern by the continuous touch.

According to an exemplary embodiment, the moving path setting region includes a plurality of nodes in an nxn grid and the pattern is formed by a continuous touch passing each node.

According to an exemplary embodiment, the method further includes calculating the input pattern as a control attribute value for the moving path and calculating a setting value corresponding to the touch input into the moving speed setting region as a control attribute value for the moving speed.

According to an exemplary embodiment, the control method further includes a control based on an emotion selected by a user of the mobile communication terminal, wherein, when a control method with the control based on the emotion is selected by a user from the plurality of control methods, displaying the control screen to set at least one of a moving direction, a moving pattern, a moving speed, text to speech (TTS) and a color and a lighting speed of a light-emitting part of the target terminal.

According to an exemplary embodiment, the control method further includes a control of contents stored in the target terminal, wherein, when a control method with the control of contents is selected from the plurality of control methods, displaying the control screen to set at least one of a playback, pausing a playback and an output method of the contents stored in the target terminal.

According to yet another aspect of an exemplary embodiment, there is provided a user interface for remotely controlling a target terminal by a mobile communication terminal, comprising: a list of a plurality of control methods displayed for a remote control of the target terminal; and a control screen displayed corresponding to a control method selected from the list of control methods, wherein the control method includes at least one of a directional touch, a tilt and a pattern input by a continuous touch, wherein the control screen using the directional touch includes a first action setting region to set at least one of a moving direction, a distance and a speed of the target terminal by using the directional touch, wherein the control screen using the tilt includes a second action setting region to set at least one of the moving direction, the distance and the speed of the target terminal by using the tilt of the mobile communication terminal, wherein the control screen using the pattern input by continuous touch includes at least one of a moving path setting region to set moving path of the target terminal and the moving speed setting region according to the pattern by the continuous touch.

According to an exemplary embodiment, the first action setting region includes a first touch region and a second touch region in a bar type indicating up/down direction, wherein the first touch region corresponds to a control of the left driving means of the target terminal and the second touch region corresponds to control of the right driving means of the target terminal.

According to an exemplary embodiment, the touch in an up or down direction for the first touch region or the second touch region converts direction of the target terminal and simultaneous touch in the up or down direction for the first touch region and the second touch region moves the target terminal to the up or down direction.

According to an exemplary embodiment, the first action setting region further includes a moving speed setting region to set a moving speed of the target terminal, wherein the first touch region and the second touch region further sets a moving speed of the target terminal through the directional touch when the first action setting region does not include the moving speed setting region.

According to yet another exemplary embodiment, the first action setting region includes a cross-typed touch region indicating up/down/left/right direction, wherein each direction of the cross-typed touch corresponds to each moving direction of the target terminal.

According to an exemplary embodiment, the second action setting region displays a plurality of concentric circles having different radius, wherein an avatar relating to the target terminal is displayed on the plurality of concentric circles based on at least one of calculated moving distance and calculated direction of the avatar.

According to an exemplary embodiment, the avatar moves with respect to the plurality of concentric circles according to a tilt angle and a duration of the tilt of the mobile communication terminal and a moving distance, a direction and a speed of the target terminal which are set according to a moving distance, a direction and speed of the avatar moving with respect to the plurality of concentric circles.

According to an exemplary embodiment, the second action setting region includes a fingerprint region which comes in contact with user's fingerprint of the mobile communication terminal, wherein a motion is set which includes a tilt which is performed while the user's fingerprint is in contact to the fingerprint region, moving direction, and speed of the target terminal.

According to an exemplary embodiment, the moving path setting region includes a plurality of nodes in an nxn grid and the pattern is formed by a continuous touch passing through each node.

According to an exemplary embodiment, the moving speed setting region includes a moving speed setting bar to set a moving speed of the target terminal by touching the moving speed setting region into an up or down direction, wherein the moving speed setting bar includes a current speed displaying part which displays current moving speed of the target terminal.

According to an exemplary embodiment, the moving speed setting region includes a current speed displaying part displaying current moving speed of the target terminal and a numeric pad to set the moving speed of the target terminal.

According to an exemplary embodiment, the control method further includes a control based on an emotion selected by a user of the mobile communication terminal, wherein the control screen of the control method based on the emotion selected by a user sets at least one of a moving direction, a moving pattern, a moving speed, text to speech (TTS) and a color and a lighting speed of a light-emitting part of the target terminal.

According to an exemplary embodiment, the control method further includes a control of contents stored in the target terminal, wherein the control screen of the control of contents sets at least one of a playback, pausing of the playback and an output method of the contents stored in the target terminal.

According to another aspect of exemplary embodiments, there is provided a remote control system comprising: a mobile communication terminal configured to display a control screen corresponding to a control method selected from a plurality of control methods for a remote control of a target terminal, and further configured to transmit a control message including a control attribute value set for the selected control method displayed on the control screen; and the target terminal configured to receive the control message from the mobile communication terminal, and configured to extract the selected control method and a control attribute value according to the selected control method, wherein the control method includes at least one of a directional touch, a tilt, a pattern input by continuous touch, a control based on an emotion selected by a user of the mobile communication terminal and a control of contents stored in the target terminal and further configured to set the control attribute value according to the control method.

According to an exemplary embodiment, when the directional touch and the tilt are selected from the control methods, the mobile communication terminal displays the control screen having at least one of a first region to set at least one of a moving direction and a distance of the target terminal and a second region to set a moving speed of the target terminal.

According to an exemplary embodiment, when the directional touch and the tilt is selected from the control methods, the mobile communication terminal displays the control screen having an action setting region to set at least one of a moving direction, a distance and a moving speed of the target terminal.

According to an exemplary embodiment, when the pattern input by a continuous touch is selected from the control methods, displays the control screen having at least one of a first region to set moving path of the target terminal and a second region to set moving speed of the target terminal.

According to an exemplary embodiment, when the control based on the emotion is selected from the control methods, the mobile communication terminal displays the control screen to set at least one of a moving direction, a moving pattern, a moving speed, text to speech (TTS) and a color and a lighting speed of a light-emitting part of the target terminal.

According to an exemplary embodiment, when the control of contents is selected from the control methods, the mobile communication terminal displays the control screen to set at least one of a playback, a pausing of the playback and an output method of the contents stored in the target terminal.

Particular descriptions to achieve the aspects will be apparent when referred with the accompanying drawings and exemplary embodiments which will be described below.

Although more detailed descriptions will be given by exemplary embodiments, those are only for explanation and there is no intention to limit the inventive concept. Those exemplary embodiments are to complete the disclosure and are to provide the spirit to those skilled in the art.

According to any of the method and system for a remote control and the remote-controlled user interface, a target terminal can be easily controlled through various interfaces provided by a mobile communication terminal.

In addition, the interface controlling a target terminal is intuitive so that a moving direction, a distance, and a speed of the target terminal can be picked at a glance.

In addition, controlled attributes can be determined directly by a user through the interface controlling a target terminal.

BRIEF DESCRIPTION OF THE DRAWINGS

Non-limiting and non-exhaustive exemplary embodiments will be described in conjunction with the accompanying drawings. Understanding that these drawings depict only exemplary embodiments and are, therefore, not to be intended to limit its scope, the exemplary embodiments will be described with specificity and detail taken in conjunction with the accompanying drawings, in which:

FIG. 2 to FIG. 4 are views illustrating control screens of control methods according to an exemplary embodiment.

FIG. 8 to FIG. 10 are views illustrating control screens of control methods according to yet another exemplary embodiment.

FIG. 11 to FIG. 14 are views illustrating control screens of control methods according to yet another exemplary embodiment.

FIGS. 15 to 17 are views illustrating control screens of control methods according to yet another exemplary embodiment.

DETAILED DESCRIPTION OF EXEMPLARY EMBODIMENTS

Figure 1:
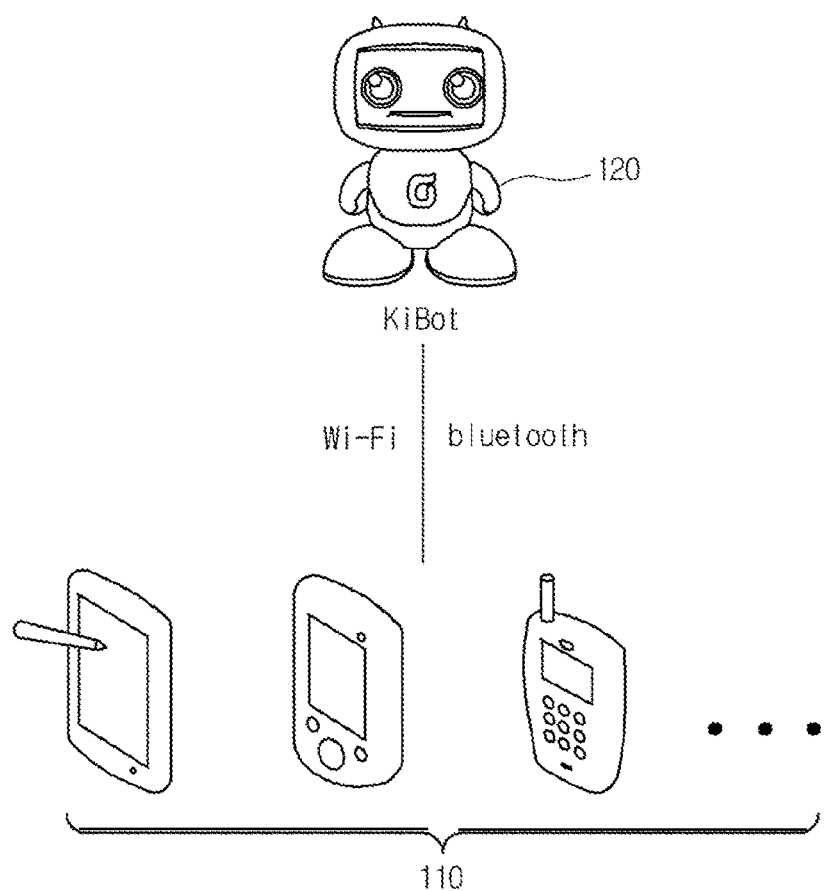
FIG. 1 is a view illustrating a configuration of a remote control system according to an exemplary embodiment.

While inventive concept will be described with reference to exemplary embodiments and accompanying drawings in more detail, it is to be appreciated that various changes and modifications thereof may be made.

There is no intention to limit inventive concept to exemplary embodiments and accompanying drawings but it is to be appreciated that the inventive concept includes all modifications, alterations, equivalents and substituents included in the spirit and scope of the inventive concept.

Throughout the description of exemplary embodiments, when describing a certain technology is determined to evade the point of the inventive concept, the pertinent detailed description will be omitted.

Descriptions which are not necessary to understand exemplary embodiments will be omitted in order to clearly explain the exemplary embodiments in the drawings, and analogous components are rendered with analogous reference numbers throughout the description of exemplary embodiments.

In exemplary embodiments, an expression such as "connect(ed)" is intended to include not only "direct(ly) connect(ed)" but also "indirect(ly) connect(ed)" having a different component in the middle.

In addition, an expression such as "comprising" is intended to designate a characteristic, a number, a step, an operation, an element, a part or combinations thereof, and shall not be construed to preclude any presence or possibility of one or more other characteristics, numbers, steps, operations, elements, parts or combinations thereof.

Hereinafter, exemplary embodiments will be described with reference to the accompanying drawings.

FIG. 1 is a view illustrating a configuration of a remote control system according to an exemplary embodiment.

A remote control system according to an exemplary embodiment of includes one or more mobile communication terminal 110 and a target terminal 120. In an exemplary embodiment, the mobile communication terminal 110 is a tangible remote control having a user interface with buttons and/or microphone and/or touch screen and/or stylus operated. The target terminal 120 may be a tangible robot or tangible other device. The mobile communication terminal 110 and the target terminal 120 may include a display, a memory, and a processor.

The mobile communication terminal 110, when one from a plurality of control methods for remote control is selected, displays a control screen corresponding to the selected control method and when a control attribute value displayed in the control screen is set, transmits a control message comprising the set control attribute value to the target terminal 120.

Here, the control method may include at least one of a directional touch, tilt, pattern input by continuous touch, control based on emotion selected by a user of the mobile communication terminal 110 and control of contents stored in the target terminal 120.

In addition, the control screen includes an interface to set a control attribute value according to the control method.

Detail descriptions of control screens for each control method according to various exemplary embodiments will be explained with reference to FIG. 2 to FIG. 17.

The mobile communication terminal 110 may be connected to the target terminal 120 by using Wi-Fi or Bluetooth.

The mobile communication terminal 110 may include at least one of smart phones, mobile phones, PDAs, PMPs and notepads, which can use Wi-Fi or Bluetooth.

The target terminal 120 receives the control message from the mobile communication terminal 110 and extracts a control method from the received control message and a control attribute value according to the control method.

The target terminal 120 operates on the basis of the extracted control method and control attribute value according to the control method.

The target terminal 120 may include a robot with which the children can feel comfortable.

The robot may include a display part (screen) at one side, lighting parts on a body and each portion which is connected to the body, and driving means for moving such as a plurality of wheels and an electric motor for delivering power to the wheels.

Hereinafter, the target terminal 120 will be referred to as KiBot 120 which is a kid's robot.

Figure 2:
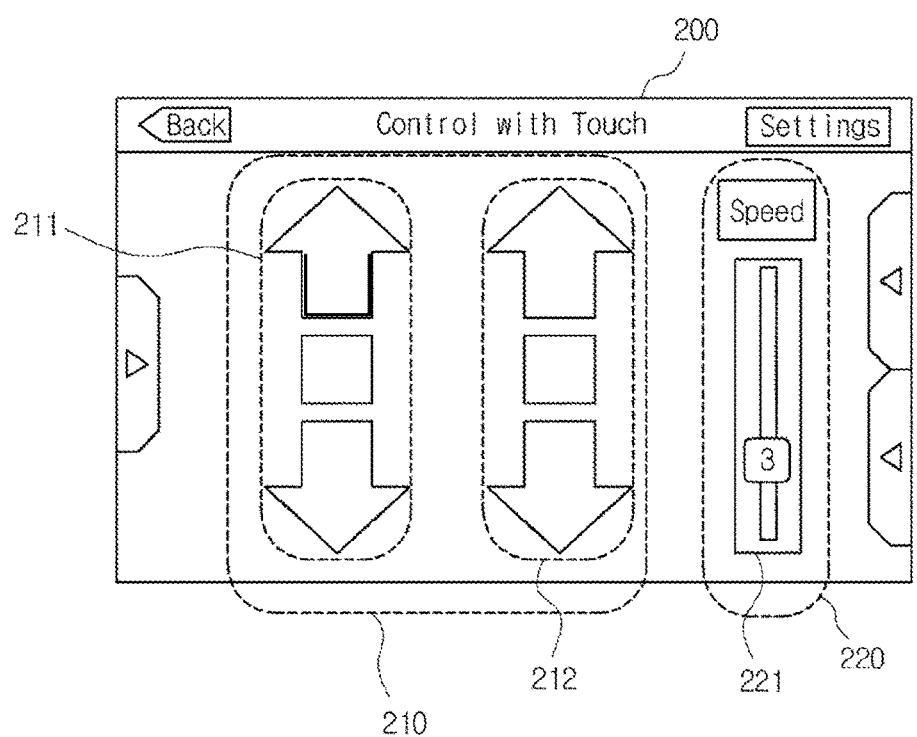
Figure 4:
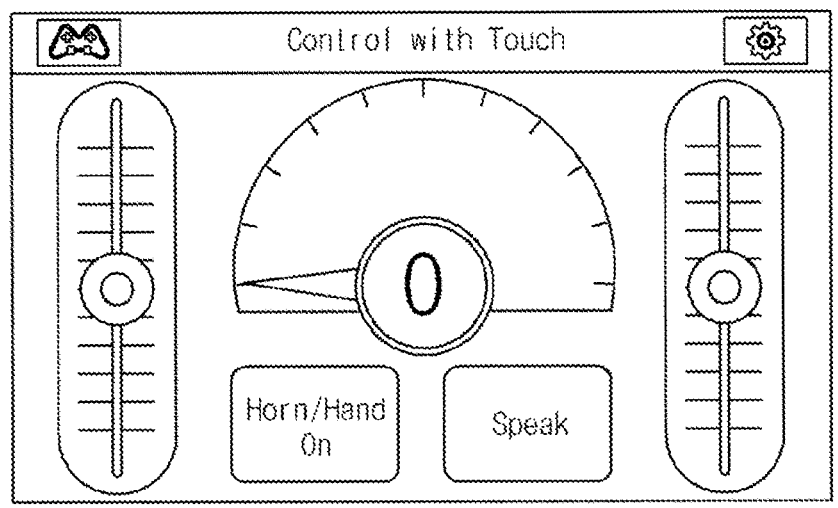

FIG. 2 to FIG. 4 are views illustrating control screens of control methods according to an exemplary embodiment.

FIG. 2 is a view illustrating a control screen where a direction is selected among a plurality of control methods via touch such as one with a stylus, user's hand, and so on.

As shown in FIG. 2, a control screen using a directional touch is first displayed as a default screen and as shown in FIG. 3, a list of control methods can be displayed according to an exemplary embodiment.

As shown in FIGS. 3A and 3B, a list of control methods is first displayed and a control screen for the selected control method can be displayed.

As shown in FIGS. 3A and 3B, the list of control methods can be displayed in various ways.

The control screen 200 shown in FIG. 2 may include at least one of a moving direction setting region 210 to set a moving direction of the KiBot 120 and a moving speed setting region 220 to set a moving speed of the KiBot 120.

The moving direction setting region 210 may include a first touch region 211 and a second touch region 212 in a bar type indicating up/down directions in which the first touch region 211 may correspond to control of the left driving means of the KiBot 120 (e.g., motor and wheels connected to the motor) and the second touch region 212 may correspond to control of the right driving means of the KiBot 120.

Accordingly, touch in an up or down direction for the first touch region 211 or the second touch region 212 may convert the direction of the KiBot 120 and simultaneous touch of an up or down direction for the first touch region 211 and the second touch region 212 may move the KiBot 120 to an up or down direction.

For example, when touch to an up direction is input in the first touch region 211, the KiBot 120 goes right while moving forward. On the other hand, when touch to a down direction is input, the KiBot 120 goes left while moving in the reverse direction.

When touch to an up direction is input in both the first touch region 211 and the second touch region 212, simultaneously, the KiBot 120 moves straight.

Moving distance of the KiBot 120 may vary with the length of touch input to the first touch region 211 and the second touch region 212.

For example, when the total length of the arrow indicating each direction of the first touch region 211 equals to 30 cm of moving distance of the KiBot and touch is input to the most end of the arrow in an up direction, the KiBot 120 may move about 30 cm. When touch is inputted to the middle of the arrow in an up direction, the KiBot 120 may move about 15 cm.

Regardless of the length of the touch input to the first touch region 211 and the second touch region 212, when touch with a direction is input, the KiBot 120 may also move to the corresponding direction for a predetermined distance.

According to another exemplary embodiment, the moving direction setting region 210 may include a cross-typed touch region indicating up/down/left/right direction.

Here, each direction of the cross-typed touch may correspond to each moving direction of the KiBot 120.

As shown in FIG. 2, the moving speed setting region 220 may include a moving speed setting bar 221 to set moving speed of the KiBot 120 by touching in an up/down direction.

The moving speed setting bar 221 may include a current speed displaying part indicating current moving speed of the KiBot 120.

According to another exemplary embodiment, the moving speed setting region 220 may include a numeric pad to set moving speed of the KiBot 120.

Namely, unlike the moving speed setting bar 221 which controls the moving speed by touch in an up/down direction, direct touch to a number the numeric pad corresponding to the moving speed may control the moving speed.

The mobile communication terminal 110 may calculate direction and distance of the touch input in the moving direction setting region 210 as a control attribute value for moving direction and moving distance of the KiBot 120, calculate a value corresponding to the touch input to the moving speed setting region 220 as a control attribute value for the moving speed, and transmit the result to the KiBot 120.

FIG. 4 is a view illustrating a diagram when a directional touch is selected among a plurality of control methods which is a different exemplary embodiment from the FIG. 2.

The diagram in FIG. 4 does not include moving speed setting region 220 shown in the control screen 200 of FIG. 2 and moving direction and moving speed of the KiBot 120 may be set according to touch of touch regions in a bar type arranged in the left and the right.

For example, the bar-typed touch region may be divided from −5 to 5 in which −5 may be the slowest speed and 5 is the fastest speed.

A method for controlling the KiBot 120 using the control screen shown in FIG. 4 is analogous to that using the control screen 200 of FIG. 2 so that detail description therefor is omitted.

An instrument panel positioned in the center may display speed of the KiBot 120 in a predetermined range (for example, 0-10).

Figure 5:
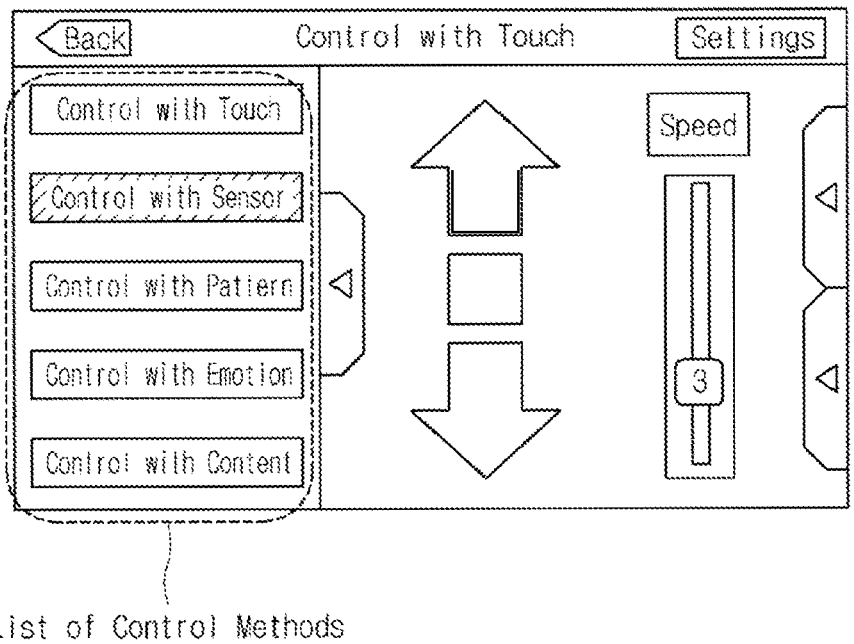
FIG. 5 to FIG. 7 are views illustrating control screens of control methods according to another exemplary embodiment.
Figure 6:
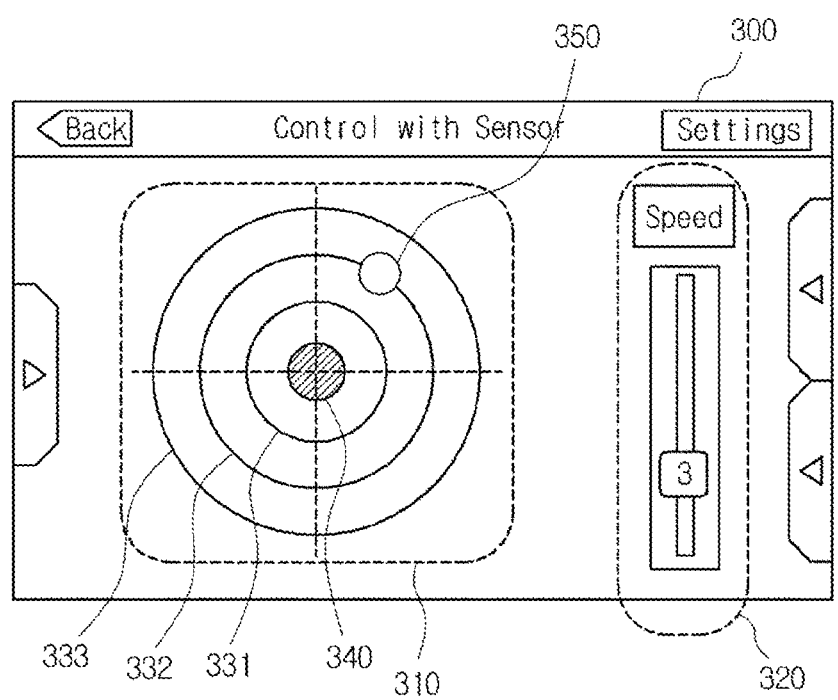
Figure 7:
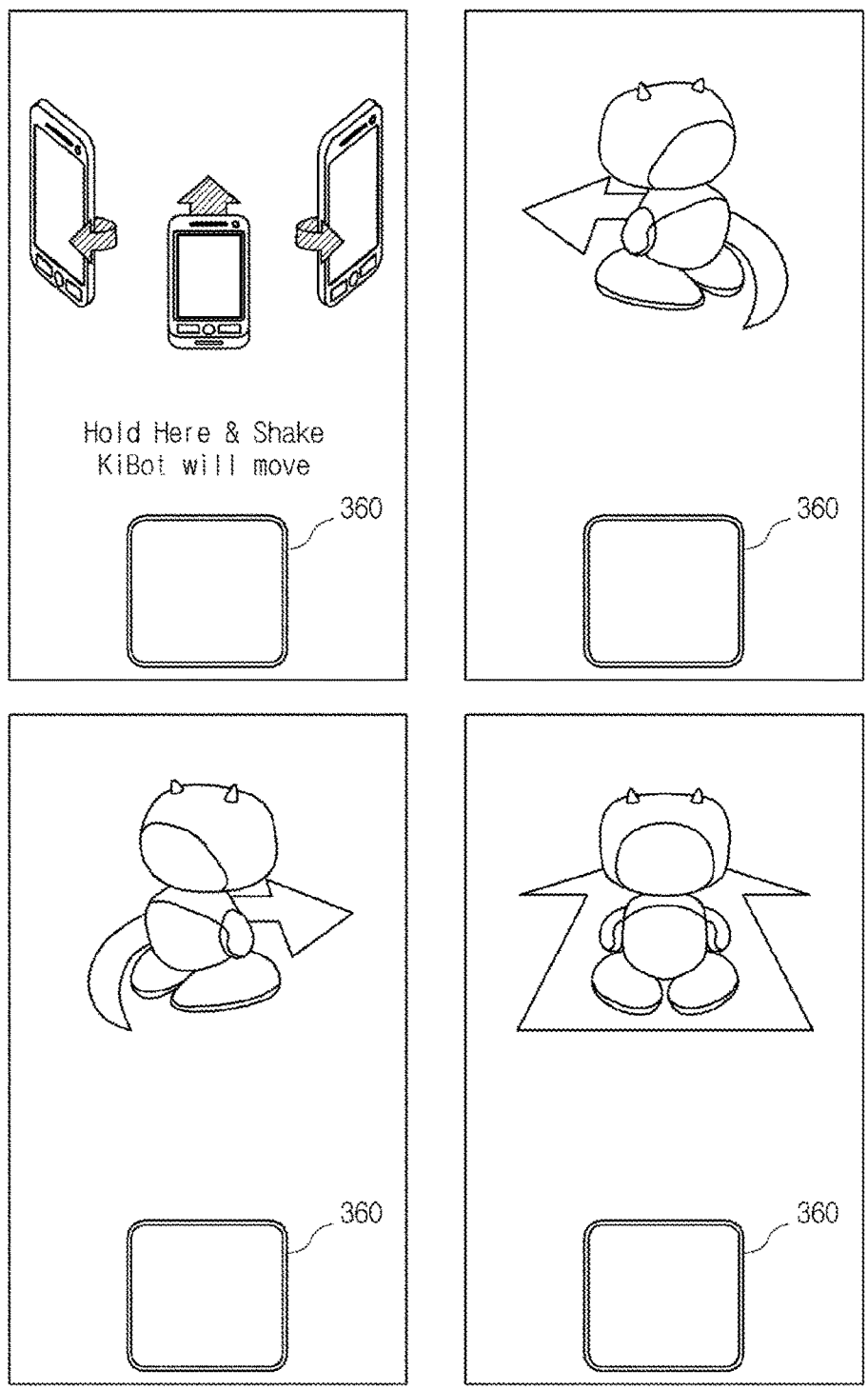

FIG. 5 to FIG. 7 are views illustrating control screens of control methods according to another exemplary embodiments.

When a control method using tilt is selected from the control methods as shown in FIG. 5, the mobile communication terminal 110 may display a control screen as shown in FIG. 6.

The control screen as shown in FIG. 6 may include at least one of a moving direction setting region 310 to set moving direction of the KiBot 120 and a moving speed setting region 320 to set moving speed of the KiBot 120 using tilt of the mobile communication terminal 110.

The moving direction setting region 310 may be displayed with a plurality of concentric circles 331-333 having different radii and an avatar 340 relating to the KiBot 120 may be displayed on the plurality of concentric circles.

The plurality of concentric circles 331-333 may relate to calculate moving distance and direction of the avatar 340. The avatar 340 may move according to tilt angle and duration of the tilt of the mobile communication terminal 110 on the plurality of concentric circles 331-333.

Moving distance and direction of the KiBot 120 may be determined according to moving distance and direction of the avatar 340 moving on the plurality of concentric circles 331-333.

For example, the first concentric circle 331, which has the smallest radius among the plurality of concentric circles 331-333, corresponds to 40 cm of the moving distance of the KiBot 120, the second concentric circle 332 corresponds to 80 cm and the third concentric circle 333, which has the largest radius, corresponds to 120 cm.

When the avatar 340 is positioned in a particular location 350 according to tilt angle and duration of the tilt of the mobile communication terminal 110, the mobile communication terminal 110 may calculate the tilt angle and duration of the tilt of the mobile communication terminal 110 as a control attribute value for moving direction and moving distance of the KiBot 120.

For this purpose, the mobile communication terminal 110 may further include a gyro sensor.

The moving speed setting region 320 is the same as the moving speed setting region 220 shown in FIG. 2 so that detail description therefor is omitted.

The mobile communication terminal 110 calculates tilt angle and duration of the tilt of the mobile communication terminal 110 input through the moving direction setting region 310 of the control screen 300 illustrated in FIG. 6 as a control attribute value for moving direction and moving distance of the KiBot 120, calculates a value corresponding to the touch input to the moving speed setting region 320 as a control attribute value for moving speed, and transmits the result to the KiBot 120.

The control screen illustrated in FIG. 7A is another exemplary embodiment to set moving direction and speed of the KiBot 120 by using tilt of the mobile communication terminal 110 and includes a fingerprint region 360, where a fingerprint of a user of the mobile communication terminal 110 contacts, at the bottom of the screen.

The user of the mobile communication terminal 110 can control moving direction and speed of the KiBot 120 by using tilt of the mobile communication terminal 110 while being in contact to the fingerprint region.

The tilt means motion of the mobile communication terminal 110 and will be understood to include the exemplary tilt described above.

The motion may include movement of the screen of the mobile communication terminal 110 to an up, down, left or right direction.

For example, when the screen of the mobile communication terminal 110 is moved upward while a user of the mobile communication terminal 110 is in contact to the fingerprint region 360, the KiBot 120 moves forward. When the screen of the mobile communication terminal 110 is moved to a left direction, the KiBot 120 turns the direction to left.

Speed of the KiBot 120 may be determined on the basis of shaking speed of the mobile communication terminal 110 by a user of the mobile communication terminal 110.

Figure 8:
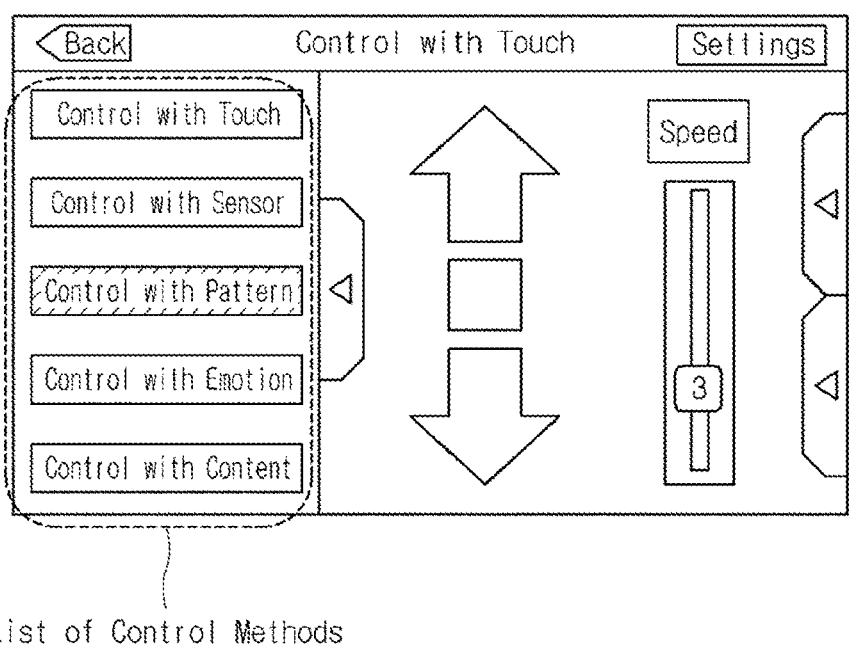

FIG. 8 to FIG. 10 are views illustrating control screens of control methods according to yet another exemplary embodiment.

When a control method with pattern input by continuous touch is selected from the control methods as shown in FIG. 8, the mobile communication terminal 110 displays the control screen as shown in FIGS. 9A and 9B.

The control screen 400 as shown in FIG. 9A may include at least one of a moving path setting region 410 to set moving path of the KiBot 120 according to the pattern by continuous touch and a moving speed setting region 420 to set moving speed of the KiBot 120.

The moving path setting region 410 may include a plurality of nodes in an nxn grid and the pattern may be formed by continuous touch passing each node.

The moving speed setting region 420 is analogous to the moving speed setting region 220 illustrated in FIG. 2 so that detail description therefor is omitted.

The mobile communication terminal 110 may calculate the pattern input through the moving path setting region 410 as a control attribute value for moving path of the KiBot 120, calculate a value corresponding to the touch input to the moving speed setting region 420 as a control attribute value for moving speed, and transmits the result to the KiBot 120. FIG. 9B is a view showing another control screen according to an exemplary embodiment.

The mobile communication terminal 110 may store a pattern separately and the stored pattern may be provided as a list shown in FIGS. 10A-10C. When a pattern is selected from the list, the mobile communication terminal 110 may calculate the selected pattern as a control attribute value for moving path of the KiBot 120.

FIGS. 11 to FIG. 14 are views illustrating control screens of control methods according to yet another exemplary embodiment.

Figure 11:
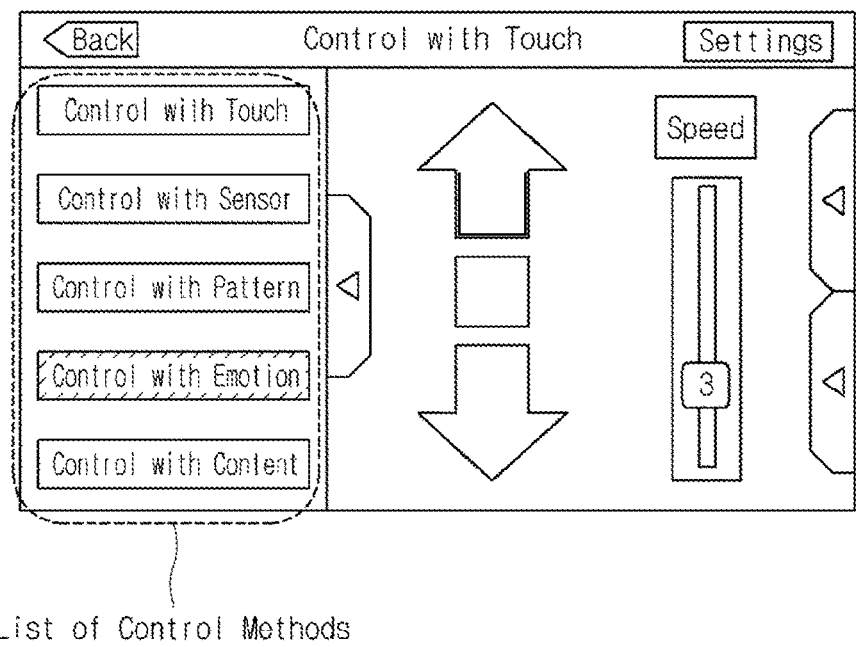
Figure 12:
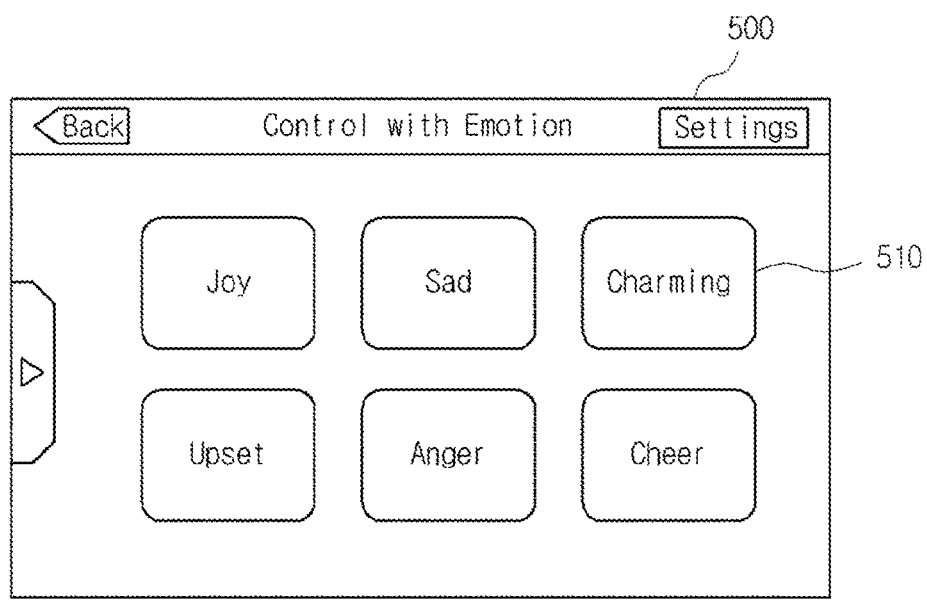

When a control method on the basis of emotion is selected from the list of the control methods as shown in FIG. 11, the mobile communication terminal 110 may display a control screen 500 as shown in FIG. 12.

When any one of emotions shown in FIG. 12 is selected by a user of the mobile communication terminal 110, the mobile communication terminal 110 may extract a control attribute value corresponding to the selected emotion from a controlled attribute database (DB) and transmit the result to the KiBot 120.

For example, when 'JOY' emotion is selected, the mobile communication terminal 110 may extract control attribute values corresponding to the 'JOY' emotion, which are values to move the KiBot 120 back and forth twice and rotates one round, display an image of a smiling face in the screen of the KiBot 120, emit a lighting part in a horn shape located on the head of the KiBot 120 in a yellow color 3 times per second, emit a lighting part located on the back of the hand in a blue color 3 times per second, emit a lighting part located in a tail in a red color 3 times per second, and text to speech (TTS) messages (for example, 'It is a good day, let's enjoy together') from the controlled attribute database (DB) and transmit the result to the KiBot 120.

The mobile communication terminal 110 may display the control screen as shown in FIGS. 13 A and B according to an exemplary embodiment and set the color and lighting speed of each lighting part of the KiBot 120. In addition, the mobile communication terminal 110 may set moving direction, moving pattern, and moving speed of the KiBot 120 according to each emotion and provide a control screen to input TTS.

The control attribute value inputted through the control screen may be stored in the controlled attribute database (DB) by being associated with the emotion corresponding to each control attribute value.

The control screen to set moving direction, moving pattern and moving speed of the KiBot 120 according to each emotion may be one described above according to an exemplary embodiment.

Figure 14:
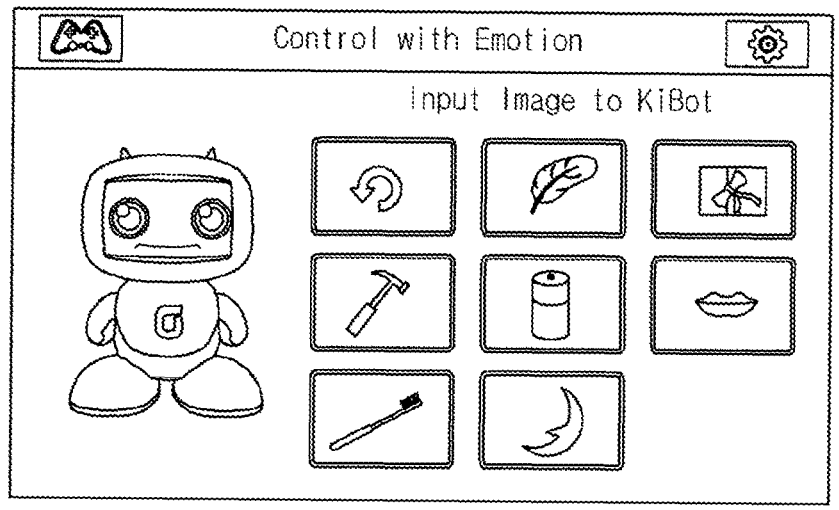

FIG. 14 is another exemplary embodiment of a control screen, which is different from the control screen 500 of FIG. 12, displays an emotion list with icons indicating emotions (hereinafter referred to as 'emotion icon') instead of texts indicating emotions. When an emotion icon is selected, a facial expression of the KiBot may be changed according to the selected emotion.

For example, when a feather icon is selected, KiBot's expression of listening may be displayed with outputting sound of 'tickling! Who talks in whispers?'. Or when a preset icon is selected, KiBot's excited expression may be displayed with outputting sound of 'Wow! Excellent'.

In addition, when a battery icon is selected, KiBot's eating expression may be displayed with outputting sound of 'I was hungry but full now, thank you'.

Figure 15:
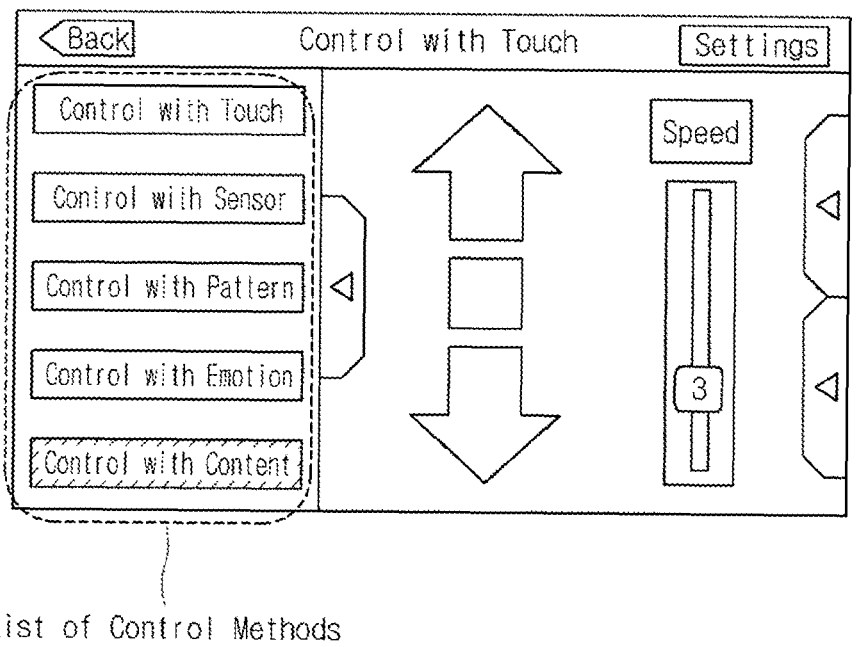
Figure 17:
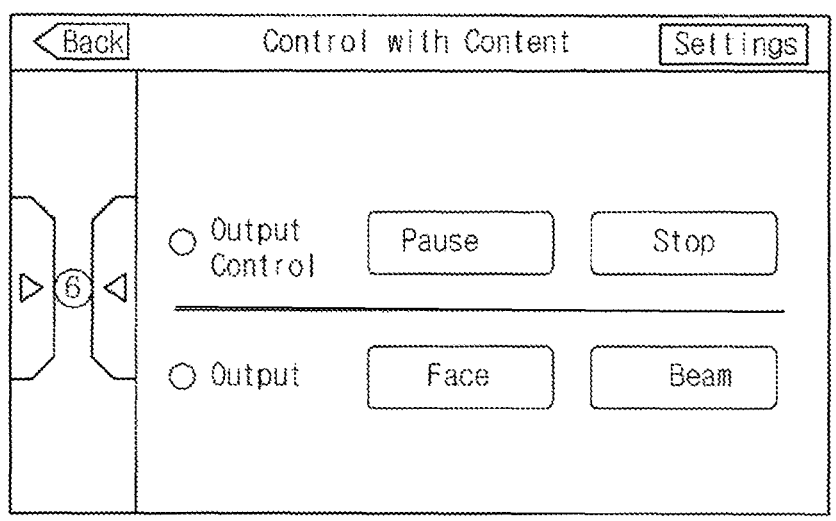

FIGS. 15 to 17 are views illustrating control screens of control methods according to yet another exemplary embodiment.

When a control method with control of contents is selected from the list of the control methods as shown in FIG. 15, the mobile communication terminal 110 may display a control screen as shown in FIGS. 16A and 16B which are lists of contents stored in the KiBot 120.

When one content is selected from the list of contents, a control screen 600 may be displayed to set at least one of playback (start), pausing playback (pause) and outputting method of the selected content as shown in FIG. 17.

When a 'Start' button is selected, the 'Start' button may be changed to a 'Pause' button or when a 'Pause' button is selected, it may be changed back to the 'Start' button.

Here, the outputting method is a selection of output means for the selected content. When 'Face' is selected, the selected content may be played through the screen located in the face of the KiBot 120 or when 'Beam' is selected, the selected content may be played through an external device such as projector which is connected to the KiBot 120.

According to an exemplary embodiment, the content which is playing may be paused.

Figure 18:
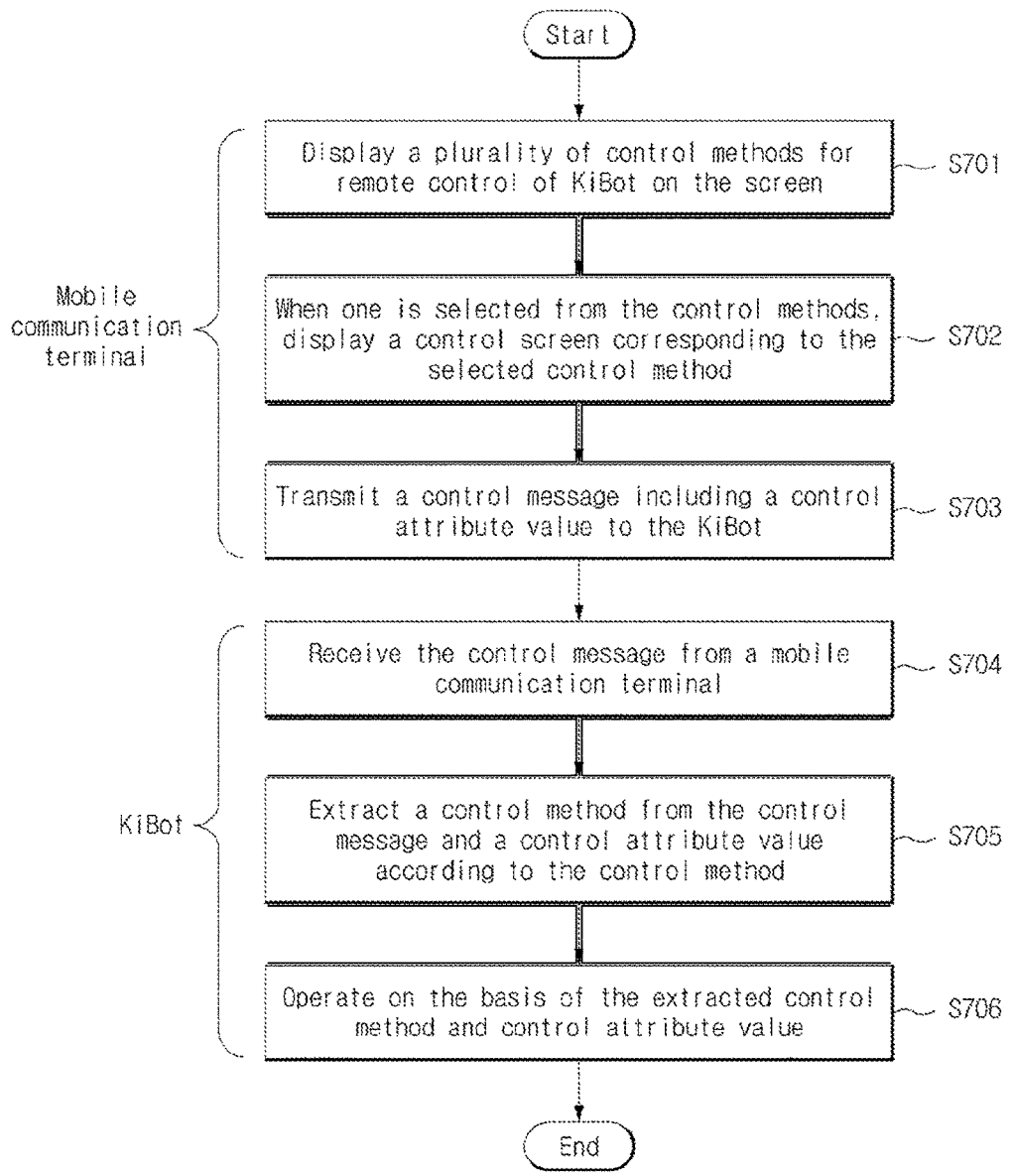
FIG. 18 is a flowchart illustrating a remote control process according to an exemplary embodiment.

FIG. 18 is a flowchart illustrating a remote control process according to an exemplary embodiment.

The mobile communication terminal 110 displays a plurality of control methods for remote control the KiBot 120 in a screen (in operation S701).

The control method may include at least one of a directional touch, a tilt, a pattern input by continuous touch, control on the basis of emotion selected by a user of the mobile communication terminal 110, and control of contents stored in the KiBot 120.

After operation S701, when one method is selected from the plurality of control methods, the mobile communication terminal 110 displays a control screen corresponding to the selected control method (in operation S702).

The control screen may include at least one of a moving direction setting region to set moving direction and distance of the KiBot 120 and a moving speed setting region to set moving speed of the KiBot 120 according to the selected control method (a directional touch and a tilt).

Further, the control screen may include at least one of a moving path setting region to set moving path of the KiBot 120 and a moving speed setting region to set moving speed of the KiBot 120 according to the selected control method (pattern input by continuous touch).

Further, the control screen may include an interface to set the color and lighting speed of each lighting part, moving direction, moving pattern and moving speed of the KiBot 120 and to input TTS according to the selected control method (control on the basis of emotion).

Further, the control screen may display the contents stored in the KiBot according to the selected control method (control of contents stored in the KiBot) and include an interface to set at least one of playback, pausing playback, and outputting method of the content selected from the displayed contents.

After operation 702, when a control attribute value displayed in the control screen is determined, the mobile communication terminal 110 transmits a control message including the control attribute value set in operation S702 to the KiBot 120 (in operation S703).

After operation S703, the KiBot 120 receives the control message from the mobile communication terminal 110 (in operation S704).

After operation S704, the KiBot 120 extracts a control method and a control attribute value according to the control method from the received control message (in operation S705).

After operation S705, the KiBot 120 performs motions on the basis of the extracted control method and control attribute value (in operation S706).

The exemplary embodiments described hereinabove are only an example and may be variously modified and altered by those skilled in the art to which inventive concept pertains without departing from essential features of the inventive concept.

Accordingly, the exemplary embodiments do not limit but describe the spirit and the scope of the inventive concept.

The scope of the inventive concept should be interpreted by the following claims and it should be interpreted that all spirits equivalent to the following claims fall with the scope of the inventive concept. It shall be understood that all modifications and exemplary embodiments conceived from the meaning and scope of the claims and their equivalents are included in the scope of the present disclosure.

What is claimed is:

1. A method for remotely controlling a target terminal by a mobile communication terminal, the method comprising:

displaying a plurality of control methods on a display of the mobile communication terminal;

displaying a control screen corresponding to a selected control method based on a selection of control method from the displayed plurality of control methods, the control screen comprising an interface configured for setting a moving pattern and a control attribute value for the target terminal according to the selected control method; and transmitting to the target terminal a control message comprising a set moving pattern and a set control attribute value based on a setting of the moving pattern and the control attribute value in the control screen, wherein each of the plurality of control methods comprises at least an input pattern configured to be drawn by a continuous touch on a region of the control screen, and wherein the input pattern drawn by the continuous touch corresponds to the moving pattern set for the target terminal according to the selected control method.

2. The remote control method of claim 1, wherein, in response to receiving a selection of another control method with a directional touch from the plurality of control methods, displaying the control screen having at least one of: a moving direction setting region to set at least one of moving direction and a moving distance of the target terminal and a moving speed setting region to set moving speed of the target terminal using the directional touch.

3. The remote control method of claim 1, wherein, in response to receiving a selection of another control method with a directional touch from the plurality of control methods, displaying the control screen having an action setting region to set a moving direction and a moving speed of the target terminal using the directional touch.

4. The remote control method of claim 2, wherein the transmitting the control message further comprises calculating a direction and a length of touch input via the control screen as a control attribute value for at least one of the moving direction, moving distance, and moving speed.

5. The remote control method of claim 1, wherein, in response to receiving a selection of another control method with a tilt from the plurality of control methods, displaying the control screen having at least one of: a moving direction setting region to set at least one of moving direction and moving distance of the target terminal and a moving speed setting region to set moving speed of the target terminal using the tilt.

6. The remote control method of claim 5, wherein the moving direction setting region comprises an avatar relating to the target terminal in which the avatar moves within the moving direction setting region according to a tilt angle and a duration of the tilt of the mobile communication terminal.

7. The remote control method of claim 5, wherein the transmitting the control message further comprises calculating a tilt angle and a duration of the tilt of the mobile communication terminal as a control attribute value for the moving direction and moving distance, and calculating a setting value corresponding to touch input to the moving speed setting region as a control attribute value for the moving speed.

8. The remote control method of claim 1, wherein, in response to receiving a selection of another control method with a tilt from the plurality of control methods, the control screen to set moving direction and moving speed of the target terminal by using motion comprising a tilt of the mobile communication terminal is displayed, wherein the control screen comprises a fingerprint region where a user of the mobile communication terminal contacts the control screen, and wherein, when motion comprising the tilt is performed while the user is in contact with the fingerprint region, setting a moving direction and a moving speed of the target terminal.

9. The remote control method of claim 8, wherein the transmitting the control message further comprises calculating motion comprising the tilt of the mobile communication terminal as a control attribute value for the moving direction and moving speed in which the motion comprising the tilt directs the screen of the mobile communication terminal to an up, down, left or right direction.

10. The remote control method of claim 1, wherein, in response to receiving a selection of another control method with the input pattern drawn by the continuous touch from the plurality of control methods, displaying the control screen having at least one of: a moving path setting region to set a moving path of the target terminal and a moving speed setting region to set moving speed of the target terminal according to the pattern by the continuous touch.

11. The remote control method of claim 10, wherein the moving path setting region comprises a plurality of nodes in an n×n grid, where n is a positive integer and further comprising forming the pattern by the continuous touch passing each node by the continuous touch.

12. The remote control method of claim 10, wherein the transmitting the control message further comprises:
calculating the input pattern as a control attribute value for the moving path, and calculating a setting value corresponding to the touch input to the moving speed setting region as a control attribute value for the moving speed.

13. The remote control method of claim 1, wherein the control method further comprises a control based on emotion selected by a user of the mobile communication terminal, and wherein, in response to receiving a selection of another control method with the control based on emotion selected by a user from the plurality of control methods, displaying the control screen to set at least one of: a moving direction, a moving pattern, a moving speed, text to speech (TTS) and color and lighting speed of a light-emitting part of the target terminal.

14. The remote control method of claim 1, wherein said one of the plurality control methods further comprises a control of contents stored in the target terminal, wherein, in response to receiving a selection of another control method with the control of contents from the plurality of control methods, displaying the control screen to set at least one of: a playback, pausing the playback, and an output method of the contents stored in the target terminal.

15. The remote control method of claim 1, wherein the control screen displays a plurality of concentric circles, each having a respectively different radius, and an avatar within at least one of the plurality of concentric circles, and a tilt of the mobile communication terminal causes a movement of both the avatar and the target terminal, a first tilt of the mobile communication terminal, at a first azimuth angle, causes the avatar to appear outside of a radius of a smallest circle of the plurality of concentric circles but within a radius of a second smallest of the plurality of concentric circles, the second smallest circle having a radius greater than that of the smallest circle, a second tilt of the mobile communication terminal, at a second azimuth angle, causes the avatar to appear outside of the radius of the second smallest circle, and the first tilt causes a lesser movement of the target terminal than the second tilt, wherein the first and the second azimuth angles are measured with respect to a user holding the mobile communication terminal.

16. The remote control method of claim 1, wherein a movement speed of the target terminal is caused to increase by shaking the mobile communication terminal.

17. The remote control method of claim 1, wherein another of the plurality of control methods further comprises at least one of a directional touch and a tilt of the mobile communication terminal.

18. The remote control method of claim 1, wherein the moving pattern is a moving pattern of motion of a robot.

19. A user interface of remotely controlling a target terminal by a mobile communication terminal, comprising:
a plurality of control methods displayed on a display of the mobile communication terminal; and
a displayable control screen corresponding to a selected control method based on a selection of the selected control method from the displayed plurality of control methods, the control screen comprising an interface configured for setting a moving pattern and a control attribute value for the target terminal according to the selected control method,
wherein each of the plurality of control methods comprises at least an input pattern configured to be drawn by a continuous touch on a region of the control screen,
wherein the input pattern drawn by the continuous touch corresponds to the moving pattern set for the target terminal according to the selected control method,
wherein the control screen using the pattern drawn by the continuous touch comprises at least one of: a moving path setting region to set a moving path of the target terminal and the moving speed setting region according to the input pattern drawn by the continuous touch, and
wherein the pattern is drawn by the continuous touch.

20. The user interface of claim 19, wherein another of the plurality of control methods comprises a directional touch,
wherein the control screen using the direction touch comprises a first action setting region to set at least one of: a moving direction, a distance and a speed of the target terminal by using the directional touch,
wherein the first action setting region comprises a first touch region and a second touch region in a bar type indicating up/down direction, and
wherein the first touch region corresponds to a control of a left driver of the target terminal and the second touch region corresponds to control of a right driver of the target terminal.

21. The user interface of claim 20, wherein touch in an up or down direction in the first touch region or the second touch region, converts a direction of the target terminal and simultaneous touch in the up or down direction in the first touch region and the second touch region moves the target terminal in the up or down direction.

22. The user interface of claim 21, wherein the first action setting region further comprises a moving speed setting region to set moving speed of the target terminal, and wherein the first touch region and second touch region further set moving speed of the target terminal through the directional touch when the first action setting region is without the moving speed setting region.

23. The user interface of claim 19, wherein the first action setting region comprises a cross-typed touch region indicating up, down, left, and right direction, and
wherein each direction of the cross-typed touch corresponds to each moving direction of the target terminal.

24. The user interface of claim 19, wherein another of the plurality of control methods comprises a tilt,
wherein the control screen using the tilt comprises a second action setting region to set at least one of the moving direction, the distance and the speed of the target terminal by using the tilt of the mobile communication terminal, and
wherein the second action setting region displays a plurality of concentric circles having different radius, and
wherein an avatar relating to the target terminal is displayed in one of the plurality of concentric circles based on calculating at least one of a moving distance and a direction of the avatar.

25. The user interface of claim 24, wherein the avatar moves in the plurality of concentric circles according to a tilt angle and a duration of the tilt of the mobile communication terminal and moving distance, direction and speed of the target terminal are set according to moving distance, direction and speed of the avatar moving in the plurality of concentric circles.

26. The user interface of claim 24, wherein the second action setting region comprises a fingerprint region where a user of the mobile communication terminal contacts the fingerprint region of the control screen,
wherein a motion comprising a tilt is performed while the user is in contact with the fingerprint region, moving direction, and speed of the target terminal, is set.

27. The user interface of claim 19, wherein the moving path setting region comprises a plurality of nodes in an n×n grid, wherein n is a positive integer and the pattern is formed by the continuous touch passing through said each node by the continuous touch.

28. The user interface of claim 19, wherein another of the plurality of control methods further comprises a control based on an emotion selected by a user of the mobile communication terminal, and
wherein the control screen of the other control method based on the emotion selected by a user sets at least one of: a moving direction, a moving pattern, a moving speed, text to speech (TTS) and color and lighting speed of a light-emitting part of the target terminal.

29. The user interface of claim 19, wherein said one of the plurality of control methods further comprises a control of contents stored in the target terminal,
wherein the control screen of the control of contents sets at least one of a playback, pausing of the playback and an output method of the contents stored in the target terminal.

30. The user interface of claim 19, wherein a total length of a bar of the bar type is the moving distance of the target terminal and an input at half of the total length of the bar causes target terminal to move half of the moving distance.

31. A remote control system comprising:
a mobile communication terminal configured to display a plurality of control methods on a display of the mobile communication terminal, to display a control screen corresponding to a selected control method based on a selection of the selected control method from the displayed plurality of control methods, the control screen comprising an interface configured for setting a moving pattern and a control attribute value for the target terminal according to the selected control method, and to transmit a control message comprising a set moving pattern and a set control attribute value based on a setting of the moving pattern and the control attribute value in the control screen; and the target terminal configured to receive the control message from the mobile communication terminal, configured to extract the set moving pattern and the set control attribute value, and configured to operate based on the set moving pattern and the set control attribute value, wherein the selected control method comprises at least a pattern input by continuous touch on the control screen displayed on the mobile communication terminal.

32. The remote control system of claim 31, wherein the mobile communication terminal, when a directional touch and a tilt is selected from the control methods, displays the control screen having at least one of a first region to set at least one of a moving direction and a distance of the target terminal and a second region to set a moving speed of the target terminal.

33. The remote control system of claim 31, wherein, when a directional touch and a tilt is selected from the control methods, the mobile communication terminal displays the control screen having an action setting region to set at least one of moving direction, distance and speed of the target terminal.

34. The remote control system of claim 31, wherein, when the input pattern drawn by the continuous touch is selected from the control methods, the mobile communication terminal displays the control screen having at least one of a first region to set a moving path of the target terminal and a second region to set a moving speed of the target terminal.

35. The remote control system of claim 31, wherein, when a control of the target terminal is based on an emotion from the control methods, the mobile communication terminal displays the control screen to set at least one of a moving direction, a moving pattern, a moving speed, text to speech (TTS) and a color and a lighting speed of a light-emitting part of the target terminal.

36. The remote control system of claim 31, wherein, when a control of contents is selected from the control methods, the mobile communication terminal displays the control screen to set at least one of a playback, pausing of the playback and an output method of the contents stored in the target terminal.

37. The remote control system of claim 31, wherein, when a control of the target terminal is based on an emotion from the control methods, the mobile communication terminal displays words indicating emotions and wherein the target terminal displays an emotion based on one of the displayed words selected via the mobile communication terminal.

38. The remote control system of claim 31, wherein, when a control of the target terminal is based on an emotion from the control methods, the mobile communication terminal displays icons indicating emotions and wherein the target terminal displays an emotion based on one of the displayed icons selected via the mobile communication terminal.

39. The remote control system of claim 31, wherein the mobile communication terminal is implemented by a first processor and the target terminal is implemented by a second processor.

* * * * *